United States Patent [19]

DeLigt et al.

[11] Patent Number: 5,059,276

[45] Date of Patent: Oct. 22, 1991

[54] VENEER EDGE GLUE APPLICATOR

[75] Inventors: John DeLigt, Covington, Va.; Lee E. Veneziale, Tyrone, Pa.

[73] Assignee: Westvaco Corporation, New York, N.Y.

[21] Appl. No.: 534,261

[22] Filed: Jun. 7, 1990

[51] Int. Cl.[5] .............................................. B32B 31/04

[52] U.S. Cl. .................................... 156/546; 156/544; 156/578; 412/33; 412/37; 414/749; 414/751; 414/789.9; 414/790.2; 414/798.2; 414/917

[58] Field of Search ....................... 156/578, 546, 544; 412/33, 37, 9; 414/789.9, 790.2, 790.3, 792.8, 798.5, 749, 751, 917, 798.2, 798.9

[56] References Cited

U.S. PATENT DOCUMENTS

| | | | |
|---|---|---|---|
| Re. 21,593 | 10/1940 | Friz | 156/546 |
| 1,643,194 | 9/1927 | Black | 156/546 |
| 1,739,088 | 12/1929 | Perry | 156/546 |
| 1,771,105 | 7/1930 | Williams | 156/546 X |
| 1,903,373 | 4/1933 | Dennis | 156/546 |
| 2,317,446 | 4/1943 | Dennis | 156/546 |
| 2,351,946 | 6/1944 | Friz | 156/546 |
| 2,398,353 | 4/1946 | Bolling | 156/546 |
| 3,757,736 | 9/1973 | Anderson | 412/37 X |
| 3,928,118 | 12/1975 | Kuhns | 412/37 X |
| 3,956,057 | 5/1976 | Jung | 156/578 |
| 4,611,705 | 9/1986 | Fluck | 414/798.9 |
| 4,784,558 | 11/1988 | Toriyama | 414/56 |

*Primary Examiner*—David A. Simmons
*Assistant Examiner*—J. Sells
*Attorney, Agent, or Firm*—W. A. Marcontell; R. L. Schmalz

[57] ABSTRACT

Bundles of presized wood veneer strips are prepared for longitudinal edge adhesive by vertical alignment of the veneer strip face planes on a horizontal machine bed surface between open clamp jaws. Upon satisfactory alignment of the strip edges on the bed surface, the clamp jaws are closed on the bundle and translated from the bed surface to an adhesive transfer roll transverse plane. As the roll traverses the bundle length, adhesive is coated upon the veneer strip bottom edges. After completing the adhesive application pass, the clamp jaws are opened on manual command to release the veneer strip bundle for manual inversion. While the clamp jaws are open, the adhesive transfer roll is returned to the starting position. The clamp jaws are manually returned to the bed surface position and the opposite edge set of the inverted bundle is aligned against the bed surface and the process is repeated. After the adhesive has dried, individual strip pairs are joined in a common plane along longitudinal edges under simultaneous compressive pressure and adhesive curing heat.

4 Claims, 6 Drawing Sheets

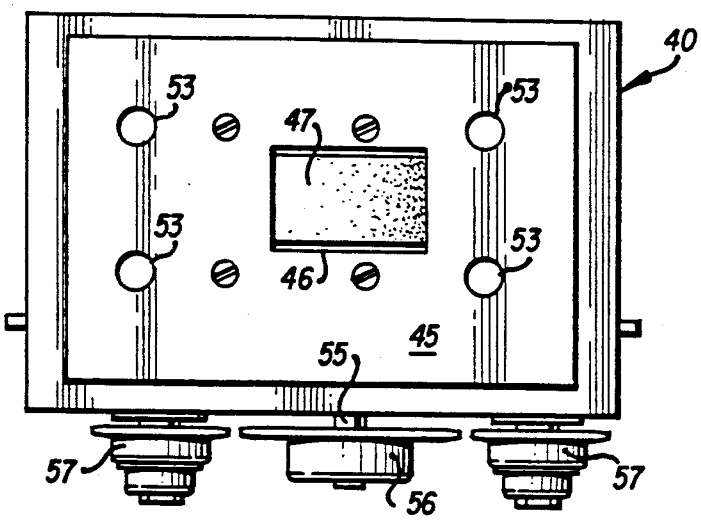
FIG. 7
FIG. 8
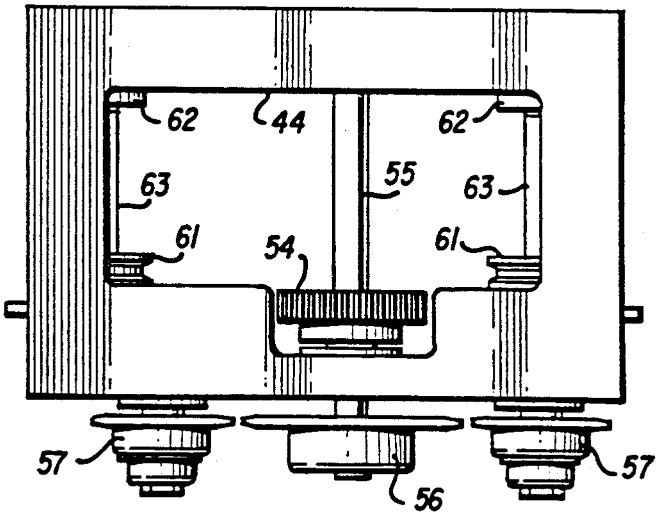
FIG. 10
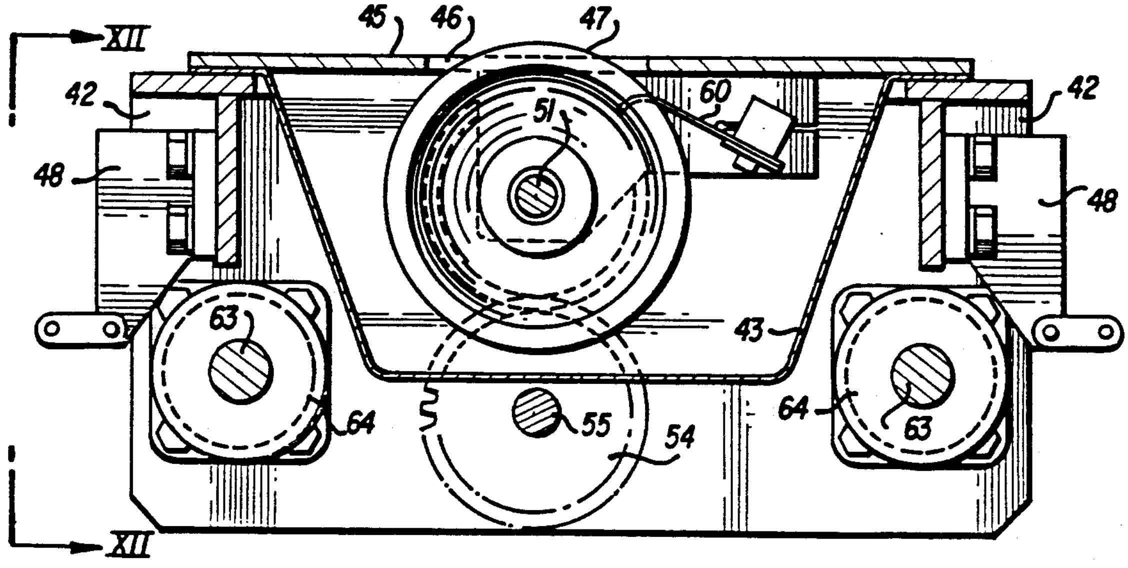

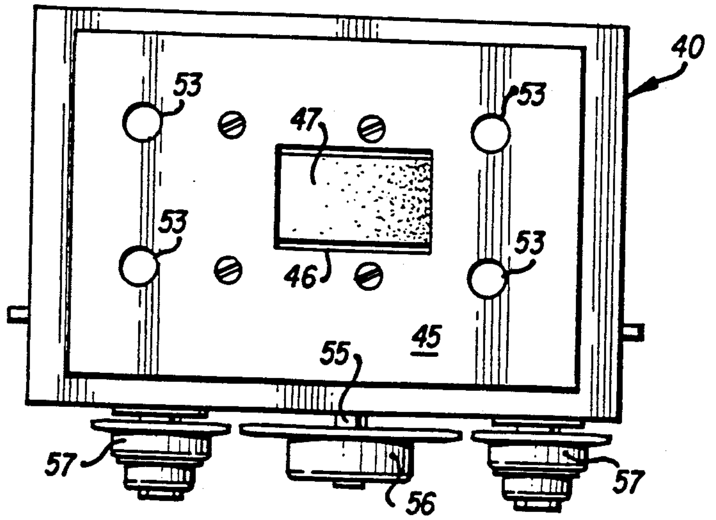
FIG. 7
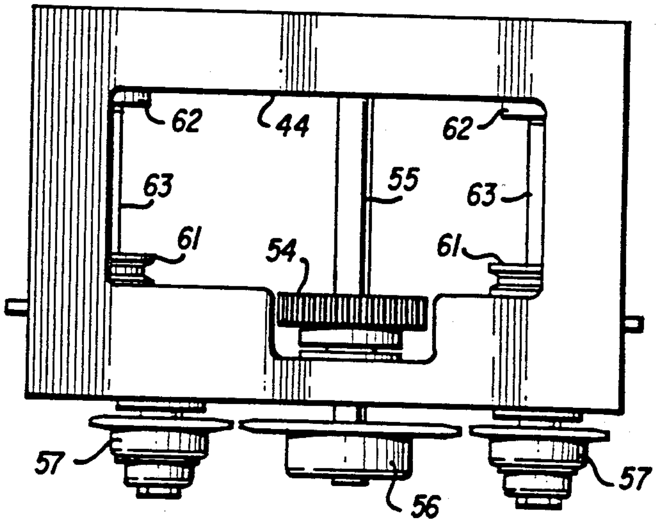
FIG. 8
FIG. 10
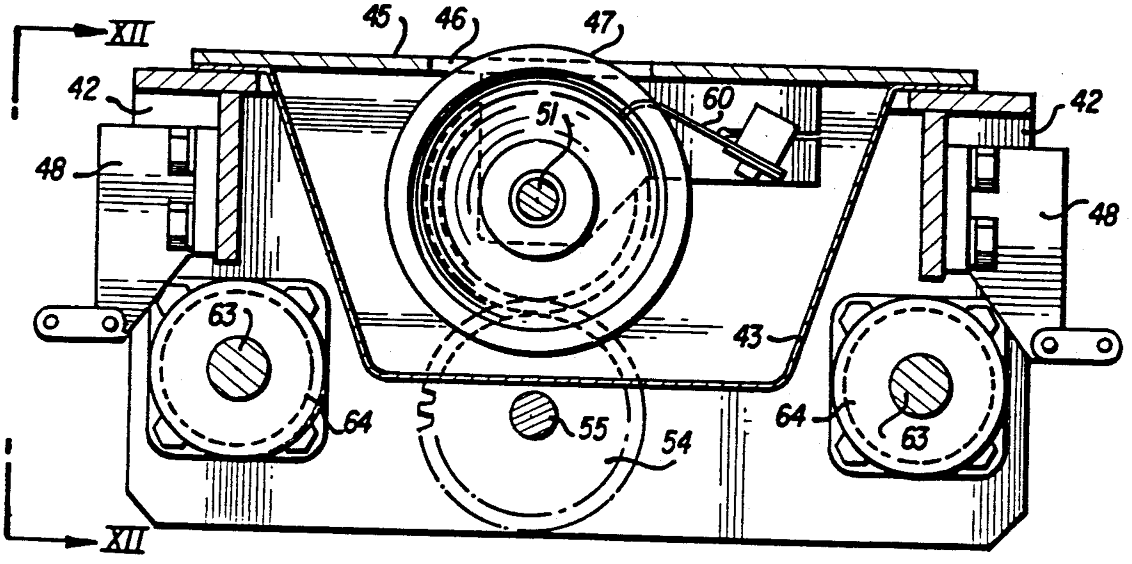

VENEER EDGE GLUE APPLICATOR

BACKGROUND OF THE INVENTION

1. Field of the Invention

The present invention relates to the art of wood veneering. More particularly, apparatus and process are disclosed for fabricating wide, integral panels from numerous narrow veneer strips.

2. Description of the Prior Art

Veneering is a craft of cladding the surface of a substrate with thin sheets of natural wood; usually of less than 1/16 inch thickness. Such veneer sheets are secured to the substrate surface adhesively.

The usual objective of veneering is to provide the veneered article with the visual texture and feel of one fabricated from a solid or integral piece of the veneer wood without the economic burden frequently associated with many aesthetically desirable wood species. Alternatively, the objective may be to give metallic structure a wood construction appearance.

In many cases, aesthetically desirable wood species have natural growth characteristics that preclude the production of wide, clear-grain boards from the species. Accordingly, a large article, such as a table top, produced from an aesthetic species, even of solid wood construction, must be fabricated by a laminated assembly of relatively small, solid wood strips. Practiced artistically, the craft of veneering includes discrete grain matching among these constituent strips to create intricate surface patterns.

Traditionally, the veneer artist has matched the grain of thin wood sheets or strips, one at a time, directly onto the substrate surface, to simulate the visual result of a solid laminate: a slow and painstaking process. Prior art efforts to commercially simulate this visual result have produced machines which mechanically adhere veneer strips or sheets together along longitudinal edges to create wide, composite sheets that are quickly and efficiently laid upon the entirety of a large, flat area substrate surface and secured by contact or hot melt adhesive.

Production of such wide sheets by one commercial process includes the bundled assembly of presized, 6 to 8 foot lengths of veneer strips. Under clamp pressure, with a horizontal sheet plane, a catalyzed urea resin adhesive is sprayed or rolled upon the vertical plane of the compacted sheet edges. After the adhesive has air dried, the bundle is disassembled. Finally, the individual veneer strips are reassembled in a single plane by heat curing edge-to-edge joints under simultaneous compressive stress.

Although the foregoing process functions reasonably well, given the fact that considerable individual artistry and discretion remains, the edge adhesive application step is less than satisfactory. Due to poor edge alignment in the vertical plane when clamped, adhesive is resultantly applied to small portions of the veneer face. If the adhesive is sprayed, the overspray is a source of atmospheric contamination and health hazard. If the adhesive is rolled on, the coating is frequently irregular and insufficient in large areas.

It is an object of the present invention, therefore, to provide an apparatus for quickly aligning and securing in the same plane, one longitudinal edge of each veneer strip in an operational batch.

Another object of the invention is to provide the plane of veneer strip edges with a uniformly applied adhesive coating of adequate and regulated thickness.

SUMMARY OF THE INVENTION

These and other objects of the invention, as will hereafter become apparent, are achieved by an apparatus that receives a bundle or batch quantity of presized veneer strips in parallel, vertical plane alignment between clamp jaws. All strips within a batch are fully supported along one longitudinal edge by a horizontal plane bed.

After edge alignment and clamping, the clamp structure translates the compacted bundle of veneer strips from the edge alignment bed position to a horizontal adhesive application plane along the course of a full traverse, horizontal axis, adhesive application carriage. As the carriage traverses the bundle length, an adhesive application wheel is rotatively driven within an adhesive supply pond. A doctor blade regulates adhesive film thickness on the applicator roll surface, and, hence, the quantity of adhesive transferred to the veneer strip edges.

BRIEF DESCRIPTION OF THE DRAWINGS

With reference to the drawings wherein like reference characters designate like or similar elements throughout the several figures of the drawings:

FIG. 7 is a top plan of the adhesive application wheel carriage with the adhesive application wheel and glue pass cover in place;

FIG. 8 is a top plan of the adhesive application wheel carriage with the adhesive application wheel and glue pan cover removed;

FIG. 9 is a drive side elevational view of the adhesive application wheel carriage assembly;

FIG. 10 is a sectional side elevation view of the adhesive application wheel carriage assembly as viewed along cutting plane X—X of FIG. 11;

FIG. 11 is a sectional end elevation view of the adhesive application wheel carriage assembly as viewed along cutting plane XI—XI of FIG. 9;

FIG. 12 is an end elevational view of the adhesive application wheel carriage assembly as viewed along cutting plane XII—XII of FIG. 10.

DESCRIPTION OF THE PREFERRED EMBODIMENT

Figure 1:
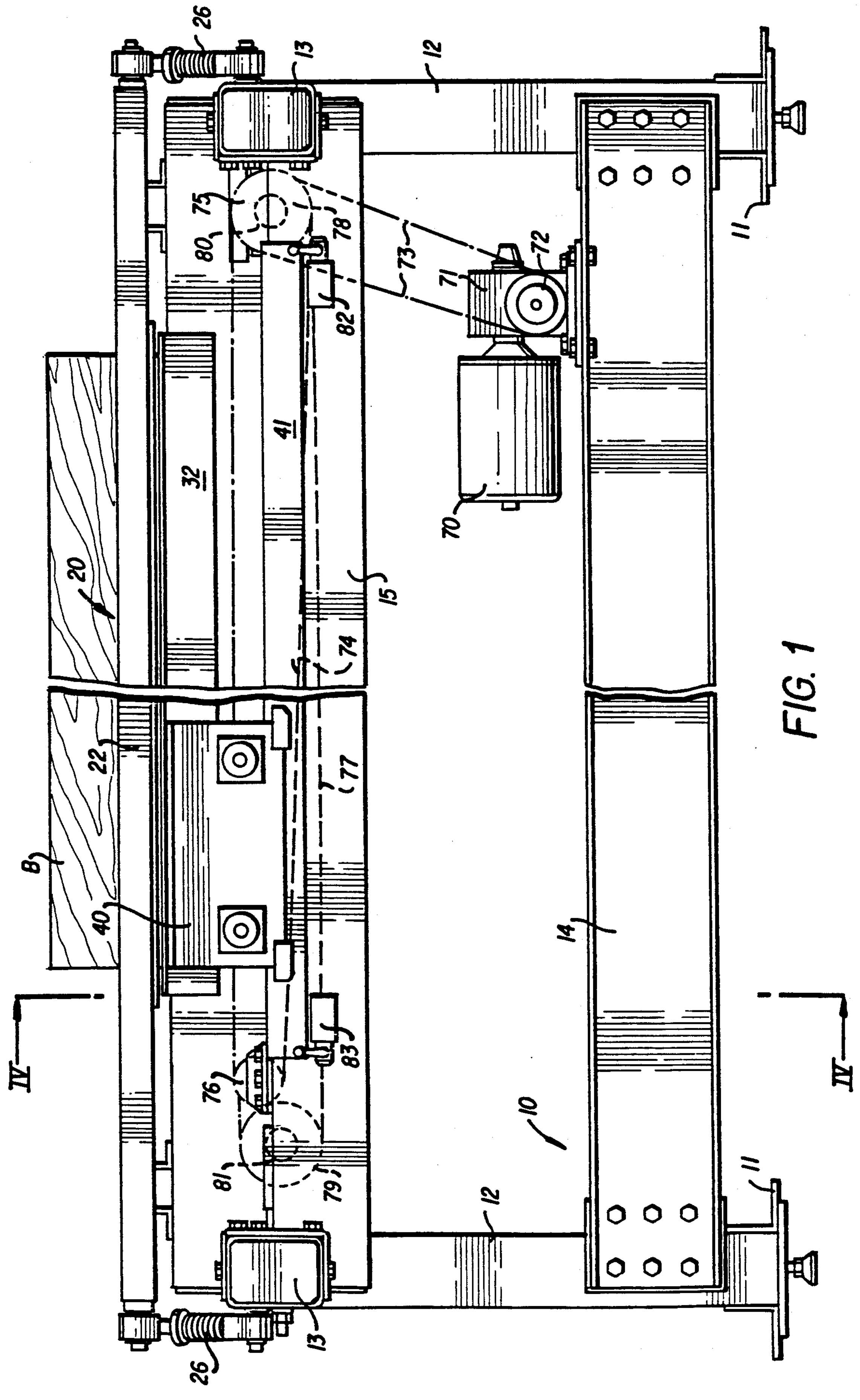
FIG. 1 is a frontal elevation of the invention.
Figure 2:
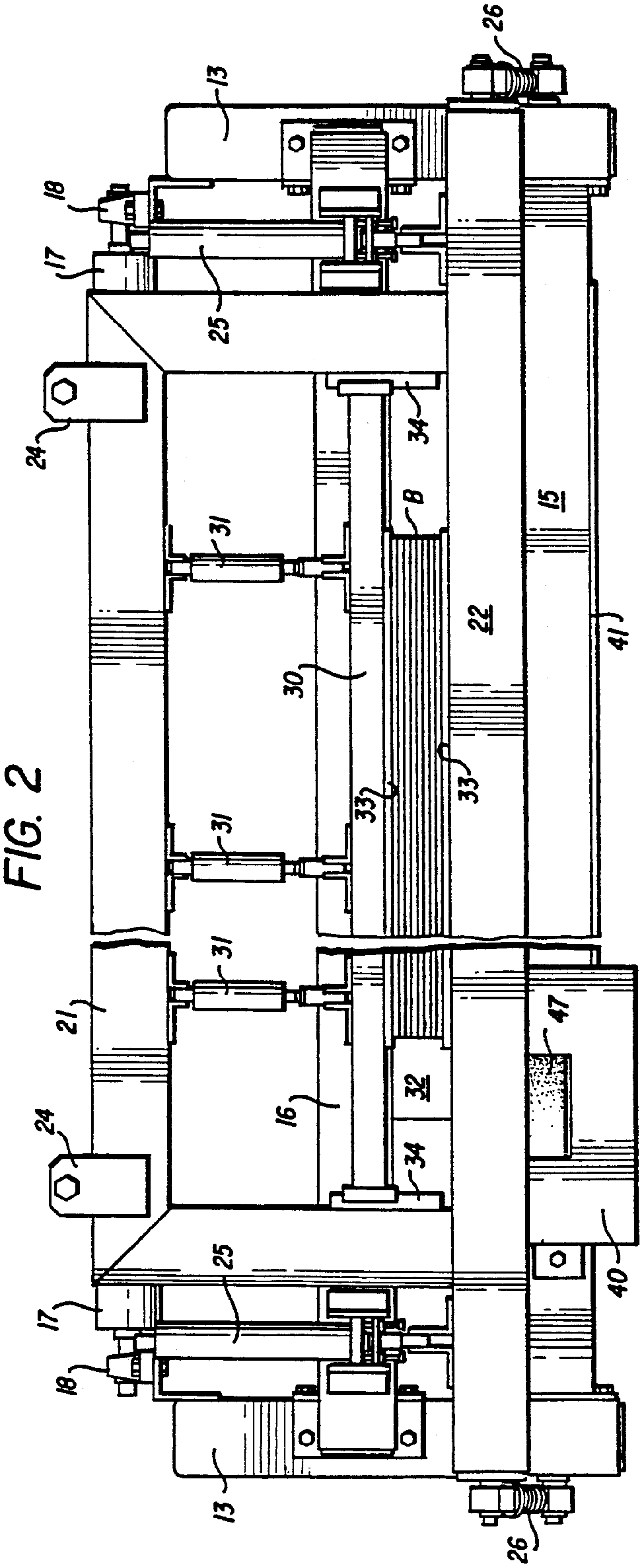
FIG. 2 is a top plan of the invention.

The three basic assemblies of the present invention are the static support frame 10, the clamp frame 20 and the adhesive carriage 40.

The static support frame 10 comprises two legs 12 tied together by a tie beam 14 and stabilized by respective foot structure 11. At the upper end of each leg 12, respective cantilever arms 13 are secured to project forward. Pillow blocks 18, secured to the upper end of each leg backside, support the axle ends of a machine length spanning torque tube 17.

Proximate of the arm 13 mid-length is a table beam 16 which supports a veneer strip alignment table 32 at a location compatible with the open jaws 33 of the clamp frame 20.

The clamp frame 20 comprises a welded assembly of a C-shaped yoke unit 21 to a base beam 22. By means of brackets 24 and torque arms 23, the clamp frame 20 is supported by the torque tube 17 for rotation about the torque tube axis. Both torque arms 23 are rigidly secured, as by welding, to the torque tube 17 at the same relative angle about the tube axis to keep the base beam 22 in parallel alignment with the strip alignment table 32.

The clamp frame 20 front end is supported by a pair of expansible pivot links 26 which are spring biased to the minimum length configuration. In combination with the clamp frame 20 and static frame 10, the pivotable torque arms 23 and expansible pivot links 26 operate as a four bar linkage that is positionally controlled by a pair of translation motors 25. A valve controlled fluid power source not shown such as air or oil drives a piston in and out of the motor 25 cylinder for the purpose of locating the clamp frame at either the loading position of FIG. 5 or the adhesive application position of FIG. 6.

Within the enclosure of yoke 21 is a sliding clamp bar 16 confined to parallel alignment with the clamp base beam 22 by guides 34. A plurality of piston/cylinder clamp motors 31 based against the yoke back bar 21 reciprocate the sliding clamp bar 16 between open and closed positions relative to the clamp jaw pads 33.

A pair of carriage tracks 41 are secured to the track beam 15 to support the adhesive transfer wheel carriage assembly 40. This carriage assembly is described with particular reference to FIGS. 7–12 and is constructed within a box frame 42 having a top plate. A cut-out 44 in the frame top plate permits a glue pan 43 to be carried as an unsecured drop-in within the frame 42 enclosure supported only by a perimeter flange thereby simplifying removal for cleaning and replenishment. The adhesive transfer wheel 47, having a resilient tire 49, is combined as a subassembly about an axle shaft 51 supported by pedestals 50. The pedestals are secured to wheel cover plate 45 which has a wheel cut-out 46 through which a small perimeter section of wheel 47 extends for veneer bundle "B" contact. Finger holes 53 expedite removal of the application wheel subassembly from the glue pan. It will noted that the transfer wheel axle 51 extends through the mounting pedestal to receive a spur gear 52 on the end thereof by which the adhesive wheel 47 is rotatively driven. Such drive train completion includes a sprocket shaft 55 which supports a chain sprocket 56 on the outboard end and a transfer gear 54 inside the frame wall in planar alignment with the wheel drive gear 52.

To confine a chain drive wrap about an arcuate portion of sprocket 56, two idler sprockets 57 are mounted on stub shafts 58 threaded into the side wall of frame 42. Adhesive application wheel drive chain 77 is threaded over the idler sprockets 57 and under the wheel drive sprocket 56. Relative to FIG. 1, the adhesive wheel drive chain 77 loop is completed about a jack shaft mounted head sprocket 78 and a tail sprocket 79. Both, head sprocket 78 and tail sprocket 79, are shaft mounted by oppositely oriented over-running clutches 80 and 81, respectively, whereby the adhesive wheel drive chain 77 is held stationary during driven movement of the carriage 40 from left to right (FIG. 1) thereby providing relative movement between the chain 77 and the wheel drive sprocket 56. When the carriage 40 is driven from right to left, however, chain 77 follows the movement at the same speed thereby stopping rotation of the adhesive drive sprocket 56.

Carriage 40 traverse drive, right and left, is provided by traverse chain 74 which is secured at opposite chain ends to the carriage 40 at hitch brackets 48. In between, the chain 74 is threaded over an idler sprocket 76 and a jack shaft mounted head sprocket 78. Jack shaft rotation is provided by a primary chain 73 driven by a reversible motor 70, speed reducer 71 and drive sprocket 72.

For direction and planar line control, the carriage 40 rides on four track wheels 61 and 62. Axles 63 carrying such track wheels are rotatively confined by bearings 64. The track wheel pair 61 on the drive side of the carriage assembly is flanged to confine the wheels laterally on the track 41 edge.

An operational cycle of the present invention begins with the clamp frame 20 in the retracted or rear-most position with the clamp jaws 33 open. In this position, the jaw opening is directly above the material alignment bed 32.

Figure 6:
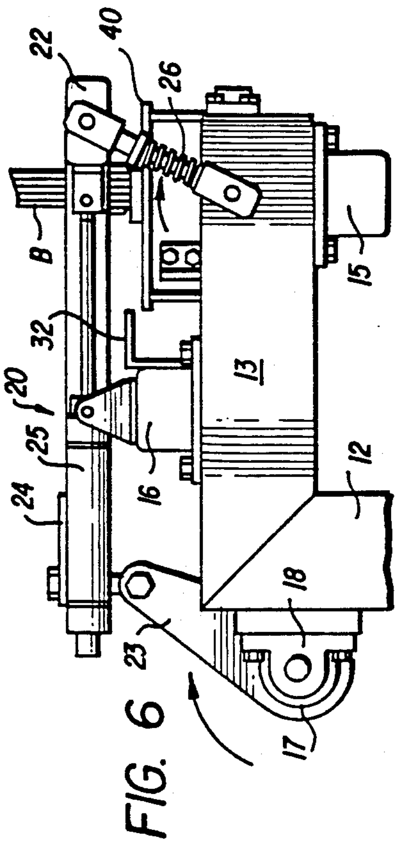
FIG. 6 is a left end elevational detail of the invention in the adhesive application position.
Figure 5:
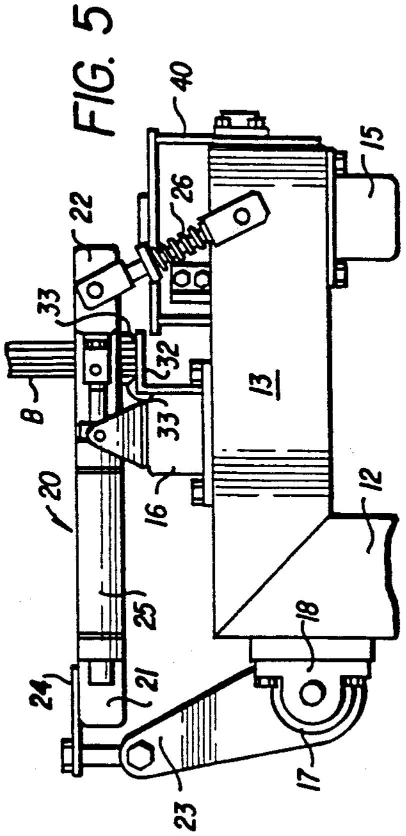
FIG. 5 is a left end elevational detail of the invention in the material loading position.
Figure 4:
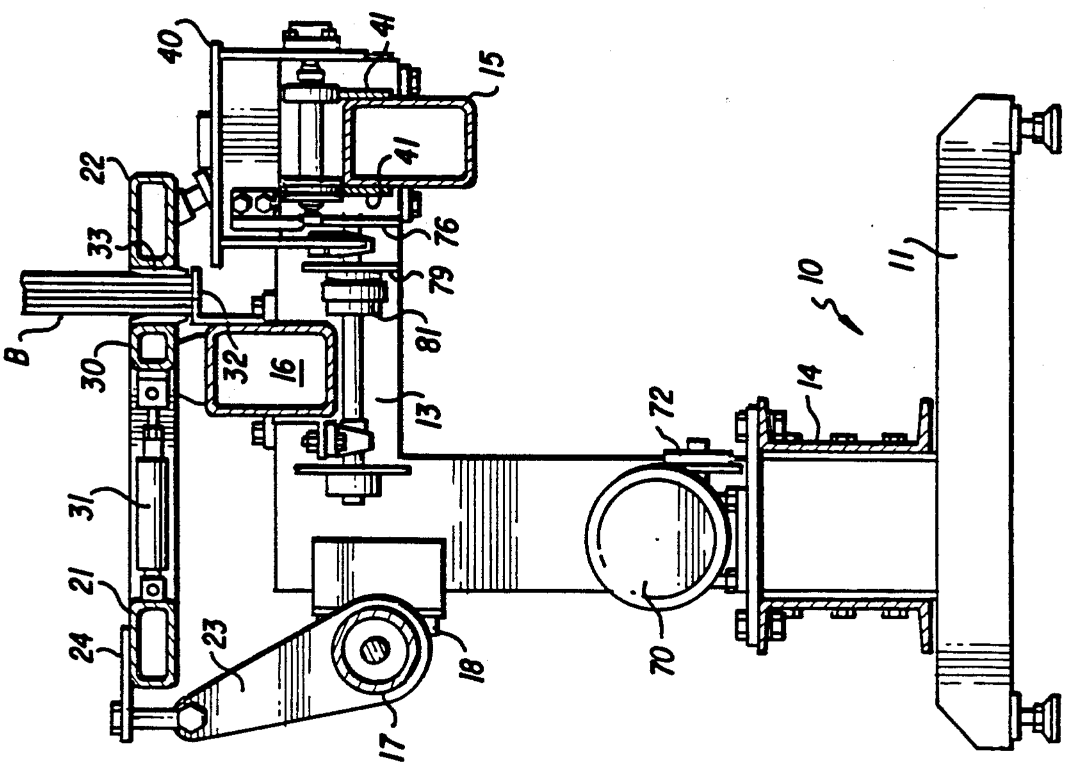
FIG. 4 is a sectional elevation of the invention as viewed along cutting plane IV—IV of FIG. 1.
Figure 3:
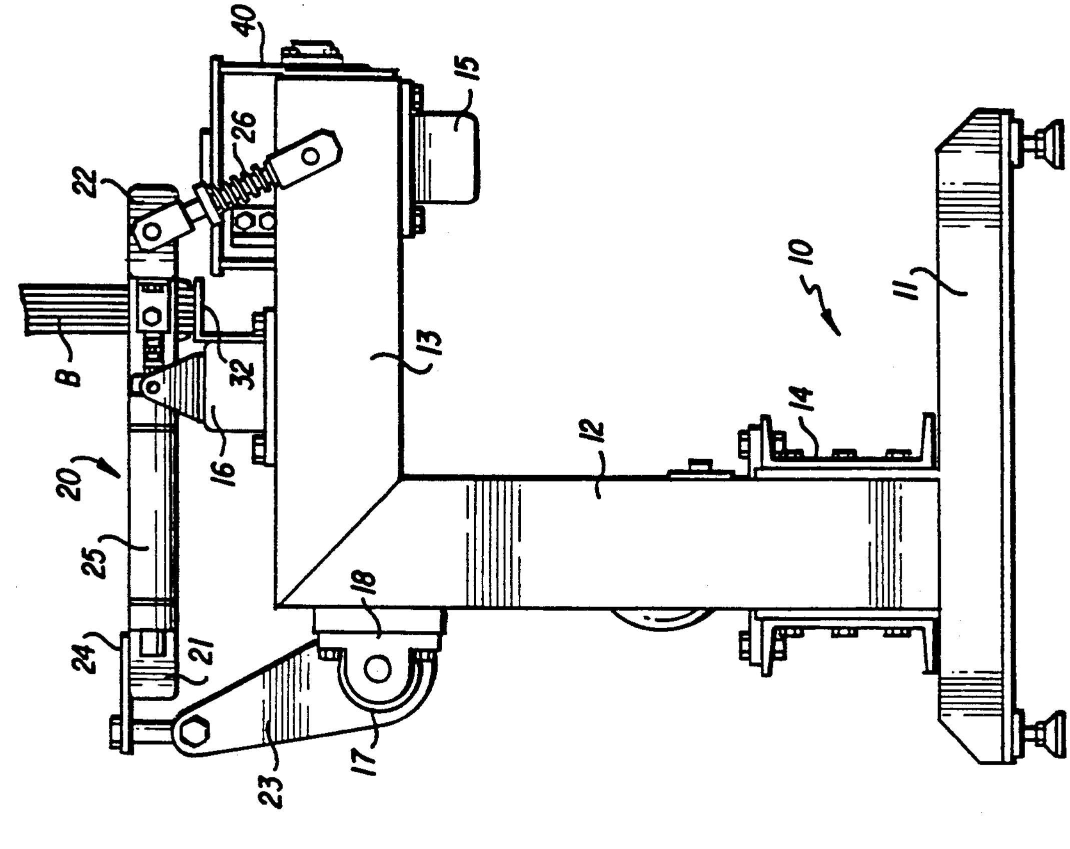
FIG. 3 is a left end elevation of the invention.
Figure 13:
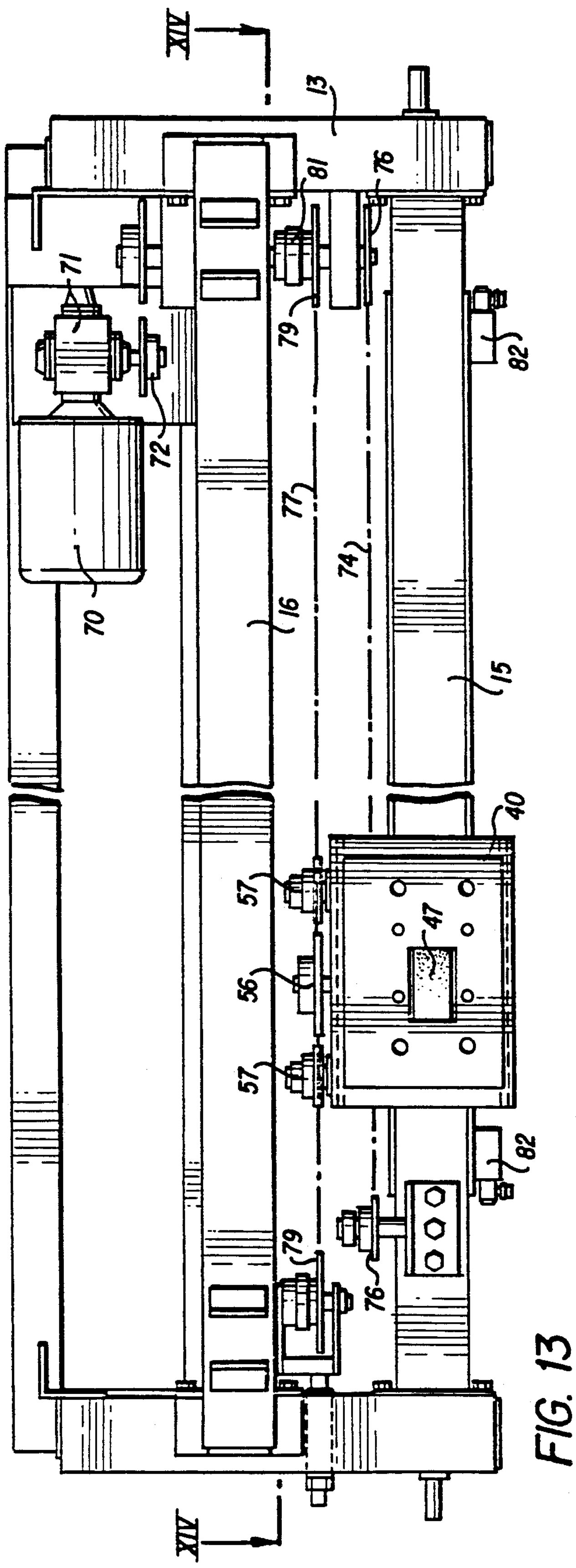
FIG. 13 is a top plan view of the wheel carriage in operative assembly with the support frame and track beam; and, FIG. 14 is a sectional side view of the wheel carriage and the support frame assembly as viewed along cutting plane XIV—XIV of FIG. 13.
Figure 14:
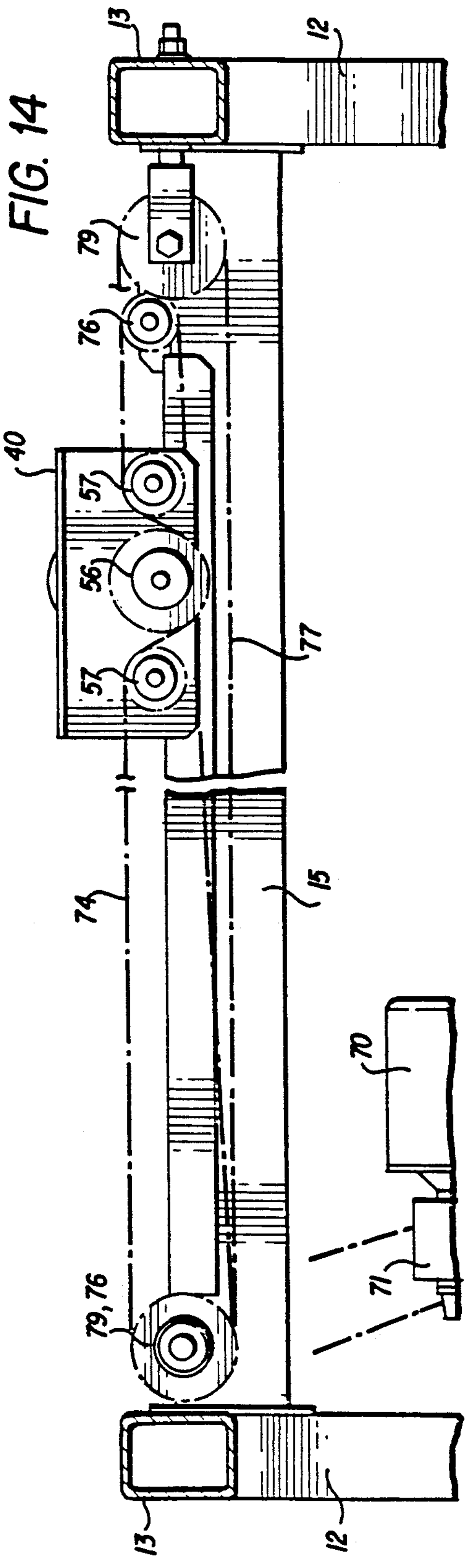

A plurality of pre-sized veneer drips B are positioned between the jaws 33 with the veneer strip bottom edges flush against the alignment bed 32 surface as shown by FIGS. 3, 4 and 5. In this condition, the jaws 33 are closed by motors 31 against the veneer strip bundle B, and the translation motor 25 is actuated to shift the entire clamp frame assembly 20 forward thereby placing the exposed lower edges of bundle B over the carriage 40 traverse plane as shown by FIG. 6.

Upon manual command, the carriage drive motor 70 is energized in a direction as to rotate the carriage 40 traverse chain 74 head sprocket 75 in a clockwise direction thereby pulling the carriage under the bundle B.

By means of the pivotal link 26 adjustable length, the exact point of veneer wheel 47 engagement with the bundle B may be precisely graduated. Ideally, the wheel 47 should slightly lift the bundle B against the spring bias as a traverse pass is made. As the carriage 40 is drawn along the tracks 41 by chain 74, the adhesive applicator wheel drive chain 77 is held stationary thereby rotating the applicator wheel 47 within the glue pan 43. Sufficient viscous adhesive is held within the glue pan reservoir to immerse a chordal portion of the wheel. Surface adhesion coats the rubber tire perimeter 49 of wheel 47 with the adhesive and doctor blade 60 screeds that layer to a regulated thickness which is pressed against the lower edge of the veneer bundle B.

At the end of the transverse pass, carriage 40 engages the limit switch 82 which disconnects electrical power to the motor 70 and reverses the polarity circuit to the motor in preparation for a return traverse. Manually, the clamp jaws 33 are opened as the bundle B is manually supported. The clamp frame assembly 20 is removed to the starting position whereat the bundle B is again inserted between the open jaws and the opposite edges aligned against bed surface 32.

Simultaneously, power is manually restored to the motor 70 which, due to the polarity reversal of limit switch 82, now drives the carriage to the left. Overrunning clutches 80 and 81 permit the adhesive wheel drive chain 77 to move with the carriage 40 thereby precluding rotation of the applicator wheel 47 during the carriage 40 return pass to the left side of the frame. At the end of the return pass, limit switch 83 reverses the motor directional polarity and interrupts the power supply.

When utility for the machine is complete for a period of time, the applicator wheel 47 is lifted from the glue pan 43 and carriage 40 by finger holes 53 in the pedestal mounting cover plate 45. As an independent unit, the applicator wheel may be immersed in cleaning solvent.

Like the applicator wheel assembly, the glue pan 43 is held in operative position only by structural fit and gravity. Consequently the pan may also be lifted from the carriage 40 top opening and cleaned by solvent immersion.

Having fully described our invention, obvious alternatives will occur to those of ordinary skill in the art. As our invention, however,

We claim:

1. Apparatus for applying adhesive to the edges of wood veneer strips comprising:

static frame means for supporting clamping frame means and adhesive application wheel carriage track means;

clamping frame means for selectively applying compressive holding force to secure one or more veneer strips in a vertical strip face plane orientation;

linkage means for translating said clamping frame means from a first, veneer strip loading position to a second, adhesive application position without changing the planar orientation of said veneer strips, said linkage means including a first plurality of torsion arm links and a second plurality of adjustable length links, one end of at least two said torsion arm links being non-rotatively secured at longitudinally separated positions to an elongated torque resisting means and another end pivotally secured to said clamping frame means, said torsion arm links and said elongated torque resisting means, as a unitized assembly, being rotatively secured to said static frame means about an axis of rotation proximate of said torque resisting means length;

alignment means having a horizontal planar surface secured to said static frame means beneath said clamping frame means in said first, veneer strip loading position for supporting a bottom edge alignment of said veneer strips; and, carriage means supported by said track means for translating adhesive application means along the aligned bottom edges of said veneer strips when said clamping frame means is in said second, adhesive application position.

2. Apparatus as described in claim 1 wherein said pair of adjustable length links elongate from a minimum length against a spring bias.

3. Apparatus as described by claim 1 wherein at least one of said torsion arm links and at least one of said adjustable length links are connected as a cooperatively opposite link set in a four-bar linkage mechanism which includes said static frame means and said clamping frame means.

4. Apparatus as described by claim 3 wherein said adjustable length links are pivotally secured to said clamping frame in the proximity of a vertical strip clamping plane.

* * * * *